United States Patent
Kayum

(10) Patent No.: US 11,112,514 B2
(45) Date of Patent: Sep. 7, 2021

(54) SYSTEMS AND METHODS FOR COMPUTED RESOURCE HYDROCARBON RESERVOIR SIMULATION AND DEVELOPMENT

(71) Applicant: Saudi Arabian Oil Company, Dhahran (SA)

(72) Inventor: Suha Naim Kayum, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 380 days.

(21) Appl. No.: 16/287,614

(22) Filed: Feb. 27, 2019

(65) Prior Publication Data

US 2020/0271801 A1    Aug. 27, 2020

(51) Int. Cl.
  *G01V 1/28*      (2006.01)
  *G06F 30/20*     (2020.01)
  *E21B 49/00*     (2006.01)
  *G06F 111/10*    (2020.01)

(52) U.S. Cl.
  CPC ............ *G01V 1/282* (2013.01); *E21B 49/003* (2013.01); *G06F 30/20* (2020.01); *G01V 2210/663* (2013.01); *G06F 2111/10* (2020.01)

(58) Field of Classification Search
  CPC .. G01V 1/282; G01V 2210/663; G06F 30/20; G06F 2111/10; G06F 9/5066; E21B 49/003
  See application file for complete search history.

(56) References Cited

U.S. PATENT DOCUMENTS

| | | | |
|---|---|---|---|
| 8,386,227 B2 | 2/2013 | Fung et al. | |
| 8,433,551 B2 | 4/2013 | Fung et al. | |
| 8,725,481 B2 | 5/2014 | Usadi et al. | |
| 9,177,086 B2 | 11/2015 | Fung | |
| 9,208,268 B2 | 12/2015 | Fung | |
| 9,262,560 B2 | 2/2016 | Hayder et al. | |
| 9,553,823 B2 | 1/2017 | Southern et al. | |
| 9,754,056 B2 | 9/2017 | Maliassov | |
| 10,025,892 B2 | 7/2018 | Whitehead et al. | |
| 2004/0015978 A1 | 1/2004 | Orii | |

(Continued)

FOREIGN PATENT DOCUMENTS

| | | |
|---|---|---|
| EP | 2315120 A2 | 4/2011 |
| WO | 2009075945 A1 | 6/2009 |

OTHER PUBLICATIONS

Debaun, T. et al, Extensible Architecture for Next Generation Scalable Parallel Reservoir Simulation (SPE 93274) pp. 1-13.

(Continued)

*Primary Examiner* — Saif A Alhija
(74) *Attorney, Agent, or Firm* — Bracewell LLP; Constance G. Rhebergen; Christopher L. Drymalla

(57) ABSTRACT

Provided are systems and method for computed resource hydrocarbon reservoir simulation that include, after processing the domain of a model to a point sufficient to determine an initial set of domain decomposition (DD) characteristics (for example, after preliminary grid calculations and initial DD operations), determining the DD characteristics of the initial DD, comparing the DD characteristics to a domain target defined by target DD parameters, and if needed, iteratively repartitioning the domain across a decreasing number of processors and reshuffling the associated weight array to achieve the domain target defined by the target DD parameters.

21 Claims, 7 Drawing Sheets

(56) References Cited

U.S. PATENT DOCUMENTS

| | | | |
|---|---|---|---|
| 2005/0273298 A1 | 12/2005 | Shah | |
| 2012/0022841 A1* | 1/2012 | Appleyard | G06F 17/12 |
| | | | 703/2 |
| 2012/0203515 A1* | 8/2012 | Pita | E21B 49/00 |
| | | | 703/2 |
| 2015/0025848 A1 | 1/2015 | Fukumoto et al. | |
| 2017/0032064 A1 | 2/2017 | Walsh et al. | |
| 2018/0137223 A1 | 5/2018 | Fung | |

OTHER PUBLICATIONS

International Search Report and Written Opinion for International Application No. PCT/US2020/019715 dated Jun. 29, 2020; pp. 1-16.

Bland, Wesley; "Introduction to Groups and Communicators" MPI Tutorial, available Jan. 16, 2019 at the website: http://mpitutorial.com/tutorials/introduction-to-groups-and-communicators/, pp. 1-10.

Christie, M.A. et al.; "Tenth SPE Comparative Solution Project: A Comparison of Upscaling Techniques" SPE 72469 SPE Reservoir Simulation Symposium, Houston, Feb. 11-14, 2001; pp. 308-317.

Crovella, Mark et al.; "Using Communication-to-Computation Ration in Parallel Program Design and Performance Prediction*'" IEEE Symposium on Parallel and Distributed Processing, Dec. 1992; pp. 238-245.

Florez, Horacio et al.; "Domain Decomposition Methods Applied to Coupled Flow-Geomechanics Reservoir Simulation" SPE 141596, SPE Reservoir Simulation Symposium, The Woodlands, Texas, Feb. 21-23, 2011; pp. 1-21.

Frost, R.J. et al.; "Scalability and Usability Aspects of Reservoir Simulation" SPE 115015, SPE Russian Oil & Gas Technical Conference and Exhibition, Moscow, Oct. 28-30, 2008; pp. 1-9.

Guo, Xuyang; "A Study of Load Imbalance for Parallel Reservoir Simulation With Multiple Partitioning Strategies" Master's thesis, Texas A&M University, Aug. 2015; pp. 1-111.

Karypis, George et al.; "A Fast and High Quality Multilevel Scheme for Partitioning Irregular Graphs" SIAM Journal on Scientific Computing, vol. 20, No. 1; pp. 359-392.

PetroWiki; "Gridding in reservoir simulation" available as of Mar. 6, 2019 at the website: https://petrowiki.org/Gridding_in_reservoir_simulation; pp. 1-6.

Sayeed, Mohamed et al.; "Measuring High-Performance Computing with Real Applications" Computing in Science & Engineering, Jul./Aug. 2008; pp. 60-70.

Tarman, Mehmet et al.; "Automatic Decomposition for Parallel Reservoir Simulation" SPE 141716, SPE Reservoir Simulation Symposium, The Woodlands, TX, Feb. 21-23, 2011; pp. 1-17.

\* cited by examiner

SYSTEMS AND METHODS FOR COMPUTED RESOURCE HYDROCARBON RESERVOIR SIMULATION AND DEVELOPMENT

FIELD

Embodiments relate generally to developing hydrocarbon reservoirs, and more particularly to computed resource hydrocarbon reservoir simulation and development.

BACKGROUND

A rock formation that resides underground is often referred to as a "subsurface formation." A porous or fractured rock formation that contains, or is expected to contain, a subsurface pool of hydrocarbons, such as oil and gas, is often referred to as a "hydrocarbon reservoir." In many instances, hydrocarbons are extracted (or "produced") from a hydrocarbon reservoir by way of a well. A well generally includes a wellbore (or "borehole") that is drilled into the Earth. A hydrocarbon well may extend into a hydrocarbon reservoir to, for example, facilitate extraction of hydrocarbons from the reservoir, injection of fluids into the reservoir, or evaluation and monitoring of the reservoir.

Exploration for and production of hydrocarbons can involve many complex phases to optimize extraction of the hydrocarbons. For example, a reservoir operator may spend time and effort assessing a hydrocarbon reservoir to identify economical and environmentally responsible ways to extract hydrocarbons from the reservoir. This can include identifying where the hydrocarbons are located and generating a field development plan (FDP) that outlines procedures for extracting hydrocarbons from the reservoir. In many instances, operators rely on simulations to characterize a reservoir and develop a FDP based on the characterization. For example, an operator may run simulations of a reservoir to determine where fluids, including water and hydrocarbons, are located in the reservoir and how they are expected to move within the reservoir, and use the results of the simulations to generate or adjust an FDP for the reservoir. In many instances, simulations are run and FDPs are updated over the course of development of a reservoir. For example, initial simulations may be run to determine locations and operating parameters for a first set of wells before they are drilled, and follow-up simulations may be run to determine updated operating parameters for the first set of wells already drilled, and locations and operating parameters for additional wells to be drilled. Thus, simulations can be an important aspect of developing a reservoir.

SUMMARY

Success of development of a hydrocarbon reservoir often depends on the ability to provide accurate and timely simulations of the reservoir. For example, a reservoir operator may be able to identify movement of hydrocarbons and other substances, such as injected water, within a reservoir based on a simulation, and oversee operation of the reservoir accordingly. This can include locating wells and adjusting well operating parameters, such as production and injection rates, to optimize extraction of hydrocarbons from the reservoir.

Simulations of reservoirs often involve representing a model of the properties of a reservoir (or "reservoir model") with a three-dimensional (3D) grid of individual cells, sometimes referred to as a "domain" of the model. In some instances, the grid can include millions or billions of cells. During a simulation run, the domain may be divided (or "partitioned") into subdomains (sometimes referred to as "sectors" or "partitions") that are processed in parallel by different computing processes. In the case of a large domain, this can involve thousands of processors working in parallel and exchanging information regarding the particular subdomain they are processing. For example, different groups of processors (or "processing cores") of a high performance computing (HPC) cluster may work in parallel on a respective subdomain to which they are assigned, including performing processing on the cells of the subdomain, and sharing information with other processing groups regarding cells that interface with one or more cells of the subdomain.

The tasks of partitioning to define the subdomains is often referred to as "domain decomposition" (or "DD"). DD can play a major role in parallel computing, often helping to reduce the time required to generate complex simulations. Unfortunately, even with the implementation of DD and a relatively large number of processors, simulations can still require a great deal of time to complete—in some instances taking hours, days, weeks or even months to complete. Thus, simulations can be costly from the perspective of computing resources that are required, and can introduce delays into developing a reservoir. In the case of limited computing resources and multiple field operators competing to use those resources, a field operator may have to forgo simulations simply because the computing resources are not available. Accordingly, efficient use of computing resources can be critical in providing accurate and timely simulations, and effective development of one or more reservoirs.

Prior attempts to improve simulation performance, including prior attempts to improve simulation processing speed and efficiency, have certain shortcomings. A common approach for improving simulation performance is to increase the number of processing cores and subdomains. The expectation is that more processing power leads to improved performance. Unfortunately, increasing the number of processing cores and subdomains does not always improve simulation performance, and can actually create inefficiencies that slow processing of simulations.

In the context of simulations implementing DD, each of the processing cores is typically responsible for processing information for the cells of the given subdomain to which the processing core is assigned. Each of the processing cores relies on exchanging, with other processing cores, data for cells outside of the subdomain (or "ghost cell" data) that impacts the portion of the simulation within the subdomain. For example, a first processing core may process saturation and porosity data for the cells within a first domain as well as exchange ghost cell data with another processing core regarding fluid flux between cells at the border of the first and second domains.

The resources consumed for the processing of the data is often referred to as the "cost of computation," and the resources consumed for the exchange (or "communication") of the data is often referred to as the "cost of communication." In the case of a coarse DD (for example, including fewer, but larger subdomains), each of the processing cores may be responsible for a relatively large set of cells, but may require a relatively small amount of communication to process the subdomain. In such a case, the ratio of the cost of communication to the cost of computation (or "communication-to-computation ratio" (CCR)) may be a small value. In the case of a fine-grain DD (for example, including more, but smaller subdomains), each of the processing cores may be responsible for a relatively small set of cells, but may require a relatively large amount of communication to process the subdomain. In such a case, the CCR may be a large value. A high CCR may indicate an over allocation of processing resources for the particular problem. As the number of subdomains increases, the cost of communication can increase to a point where increasing the number of subdomains (and processing cores) does not improve performance, but may actually degrade performance. That is, the processing will go from being computation bound (based on the amount of processing required) to communication bound (based on the amount of communication required). The term "scaling" is often used to describe a performance change versus an increase in the number of processing cores. In the above situation, the scalability may approach zero (indicating no change in performance with the addition of subdomains/processing cores), or even become negative (indicating a decrease in performance with the addition of subdomains/processing cores). The number of processing cores at which the scalability becomes negative, is often referred to as the "scalability limit."

Identifying an optimum number subdomains for a reservoir simulation can be challenging. Certain techniques attempt to determine an optimum number subdomains for a reservoir simulation early in the simulation process based on a grid of both "active" and "inactive" cells. Active cells can be defined as cells of the grid that exhibit properties that computationally contribute to flow dynamics of the simulation, such as a cell exhibiting a porosity that can enable fluid flow. Inactive cells can be defined as cells of the grid that do not exhibit properties that computationally contribute to flow dynamics of the simulation, such as a cell exhibiting a porosity (for example, zero porosity) that does not enable fluid flow. Active and inactive cells are typically identified in a grid calculation, based on a reservoir model of the reservoir which identifies known properties of respective portions of the reservoir, such as pore volume, permeability, reservoir geometry and fault locations. Typically, only the active cells are considered in a simulation, with the inactive cells being ignored based on the assumption that they do not contribute to flow dynamics of the simulation. Accordingly, with a grid calculation that identifies cells and their properties, the inactive cells are often compressed out, and the domain is partitioned into subdomains having a balance of active cells (for example, subdomains that each contain approximately the same number of active cells). Unfortunately, DD characteristics, which are based on the resulting subdomains, are not know until well into the processing of the simulation (for example, after grid calculations and partitioning into subdomains) and, thus, the subdomains may be defined without the benefit of this information. DD characteristics can include, for example, a cost of computation, a cost of communication, a volume of inter-domain communication, a volume of intra-domain communication, and a number of neighboring processes, that are associated with the subdomains defined by the DD.

Recognizing these and other shortcomings of existing techniques for hydrocarbon reservoir simulation, Applicant has developed novel systems and methods for computed resource hydrocarbon reservoir simulation and development. In some embodiments, a computed resource hydrocarbon reservoir simulation process includes, after processing the domain of a model to a point sufficient to determine an initial set of DD characteristics (for example, after preliminary grid calculations and initial DD operations), determining the DD characteristics of the initial DD (for example, a CCR of the initial DD), comparing the DD characteristics to a domain target defined by target DD parameters, and if needed, iteratively repartitioning the domain across a decreasing number of processors and reshuffling the associated weight array to achieve the domain target defined by the target DD parameters.

Provided in some embodiments is a method that includes the following: determining a model of a hydrocarbon reservoir; determining target domain decomposition parameters for a simulation of the hydrocarbon reservoir; determining an initial number of processing cores for processing the simulation of the hydrocarbon reservoir; conducting a preliminary grid calculation of the model of the hydrocarbon reservoir to determine a domain of the model of the hydrocarbon reservoir, the domain including grid cells representing a portion of the hydrocarbon reservoir, where each of the grid cells of the domain has a global cell identifier that uniquely identifies the grid cell from the other grid cells of the domain; determining a weight array for the domain, the weight array including, for each grid cell of the domain: a weight indicative of a physical property of the portion of the hydrocarbon reservoir corresponding to the grid cell; and an index that uniquely identifies the grid cell from the other grid cells of the domain; determining a connectivity graph that corresponds to the weight array; conducting, based the weight array and the connectivity graph, a DD of the domain to identify subdomains of the domain, the number of subdomains corresponding to the number of processing cores, and each of the grid cells of each subdomain being assigned a local cell identifier that uniquely identifies the grid cell from the other grid cells of the subdomain; determining, based on the subdomains identified, domain decomposition characteristics indicative of processing overhead attributable to computations and communications for the grid cells of the subdomains; comparing the domain decomposition characteristics to the target domain decomposition parameters to determine that at least one of the of the target domain decomposition parameters is not satisfied by the domain decomposition characteristics; and in response to determining that at least one of the domain decomposition parameters is not satisfied by the domain decomposition characteristics, conducting a dynamic repartitioning operation including: determining a domain decomposition snapshot including the weight array and a global-to-local mapping, the global-to-local mapping including, for each of the grid cells of the domain, a mapping of the global cell identifier for the grid cell to the local cell identifier associated with the grid cell; determining data exchange processes of the domain decomposition; determining a reduced number of processing cores; determining, based on the data exchange processes, regrouped data exchange processes; conducting, based on the weight array, the regrouped data exchange processes and the reduced number of processing cores, an updated domain decomposition to identify updated subdomains, the number of updated subdomains corresponding to the reduced number of processing cores; distributing, based on the updated subdomains and the global-to-local mapping, weight array indices to processors of processing cores associated with the updated subdomains; determining, based on the distribution of the weight array indices, an updated connectivity graph for the domain; determining, based on the updated subdomains and the updated connectivity graph for the domain, updated domain decomposition characteristics of the update subdomains, the updated domain decomposition characteristics being indicative of processing overhead attributable to computations and communications for the grid cells of the updated subdomains; comparing the updated domain decomposition characteristics of the updated subdomains to the target domain decomposition parameters to determine that the target domain decomposition parameters are satisfied by the updated domain decomposition characteristics; and in response to determining that the domain decomposition parameters are satisfied by the updated domain decomposition characteristics, conducting the simulation of the hydrocarbon reservoir using the updated subdomains identified and the reduced number of processing cores identified, to generate a simulation of the hydrocarbon reservoir.

In some embodiments, the domain decomposition characteristics include a communication-to-computation ratio (CCR). In certain embodiments, determining data exchange processes of the domain decomposition includes: identifying the message passing interface (MPI) processes for the domain decomposition; and identifying, for each of the subdomains, a subset of the MPI processes associated with the subdomain and rakings of the MPI processes within the subset. In some embodiments, determining regrouped data exchange processes includes regrouping the MPI processes for the domain decomposition to generate regrouped MPI processes corresponding to the reduced number of processing cores. In certain embodiments, the method includes generating a field development plan (FDP) for the hydrocarbon reservoir based on the simulation of the hydrocarbon reservoir. In some embodiments, the method includes: identifying well drilling parameters based on the simulation of the hydrocarbon reservoir; and drilling a well in the hydrocarbon reservoir based on the well drilling parameters. In certain embodiments, the method includes: identifying well operating parameters based on the simulation of the hydrocarbon reservoir; and operating a well in the hydrocarbon reservoir based on the well operating parameters.

Provided in some embodiments is a non-transitory computer readable storage medium including program instructions stored on the medium that are executable by a processor to perform the following operations: determining a model of a hydrocarbon reservoir; determining target domain decomposition parameters for a simulation of the hydrocarbon reservoir; determining an initial number of processing cores for processing the simulation of the hydrocarbon reservoir; conducting a preliminary grid calculation of the model of the hydrocarbon reservoir to determine a domain of the model of the hydrocarbon reservoir, the domain including grid cells representing a portion of the hydrocarbon reservoir, where each of the grid cells of the domain has a global cell identifier that uniquely identifies the grid cell from the other grid cells of the domain; determining a weight array for the domain, the weight array including, for each grid cell of the domain: a weight indicative of a physical property of the portion of the hydrocarbon reservoir corresponding to the grid cell; and an index that uniquely identifies the grid cell from the other grid cells of the domain; determining a connectivity graph that corresponds to the weight array; conducting, based the weight array and the connectivity graph, a DD of the domain to identify subdomains of the domain, the number of subdomains corresponding to the number of processing cores, and each of the grid cells of each subdomain being assigned a local cell identifier that uniquely identifies the grid cell from the other grid cells of the subdomain; determining, based on the subdomains identified, domain decomposition characteristics indicative of processing overhead attributable to computations and communications for the grid cells of the subdomains; comparing the domain decomposition characteristics to the target domain decomposition parameters to determine that at least one of the of the target domain decomposition parameters is not satisfied by the domain decomposition characteristics; and in response to determining that at least one of the domain decomposition parameters is not satisfied by the domain decomposition characteristics, conducting a dynamic repartitioning operation including: determining a domain decomposition snapshot including the weight array and a global-to-local mapping, the global-to-local mapping including, for each of the grid cells of the domain, a mapping of the global cell identifier for the grid cell to the local cell identifier associated with the grid cell; determining data exchange processes of the domain decomposition; determining a reduced number of processing cores; determining, based on the data exchange processes, regrouped data exchange processes; conducting, based on the weight array, the regrouped data exchange processes and the reduced number of processing cores, an updated domain decomposition to identify updated subdomains, the number of updated subdomains corresponding to the reduced number of processing cores; distributing, based on the updated subdomains and the global-to-local mapping, weight array indices to processors of processing cores associated with the updated subdomains; determining, based on the distribution of the weight array indices, an updated connectivity graph for the domain; determining, based on the updated subdomains and the updated connectivity graph for the domain, updated domain decomposition characteristics of the update subdomains, the updated domain decomposition characteristics being indicative of processing overhead attributable to computations and communications for the grid cells of the updated subdomains; comparing the updated domain decomposition characteristics of the updated subdomains to the target domain decomposition parameters to determine that the target domain decomposition parameters are satisfied by the updated domain decomposition characteristics; and in response to determining that the domain decomposition parameters are satisfied by the updated domain decomposition characteristics, conducting the simulation of the hydrocarbon reservoir using the updated subdomains identified and the reduced number of processing cores identified, to generate a simulation of the hydrocarbon reservoir.

In some embodiments, the domain decomposition characteristics include a communication-to-computation ratio (CCR). In certain embodiments, determining data exchange processes of the domain decomposition includes: identifying the message passing interface (MPI) processes for the domain decomposition; and identifying, for each of the subdomains, a subset of the MPI processes associated with the subdomain and rakings of the MPI processes within the subset. In some embodiments, determining regrouped data exchange processes includes regrouping the MPI processes for the domain decomposition to generate regrouped MPI processes corresponding to the reduced number of processing cores. In certain embodiments, the operations include generating a field development plan (FDP) for the hydrocarbon reservoir based on the simulation of the hydrocarbon reservoir. In some embodiments, the operations include identifying well drilling parameters based on the simulation of the hydrocarbon reservoir; and drilling a well in the hydrocarbon reservoir based on the well drilling parameters. In certain embodiments, the operations include identifying well operating parameters based on the simulation of the hydrocarbon reservoir; and operating a well in the hydrocarbon reservoir based on the well operating parameters.

Provided in some embodiments is a hydrocarbon reservoir development system that includes the following: a hydrocarbon reservoir control system non-transitory computer readable storage medium including program instructions stored on the medium that are executable by a processor to perform the following operations: determining a model of a hydrocarbon reservoir; determining target domain decomposition parameters for a simulation of the hydrocarbon reservoir; determining an initial number of processing cores for processing the simulation of the hydrocarbon reservoir; conducting a preliminary grid calculation of the model of the hydrocarbon reservoir to determine a domain of the model of the hydrocarbon reservoir, the domain including grid cells representing a portion of the hydrocarbon reservoir, where each of the grid cells of the domain has a global cell identifier that uniquely identifies the grid cell from the other grid cells of the domain; determining a weight array for the domain, the weight array including, for each grid cell of the domain: a weight indicative of a physical property of the portion of the hydrocarbon reservoir corresponding to the grid cell; and an index that uniquely identifies the grid cell from the other grid cells of the domain; determining a connectivity graph that corresponds to the weight array; conducting, based the weight array and the connectivity graph, a DD of the domain to identify subdomains of the domain, the number of subdomains corresponding to the number of processing cores, and each of the grid cells of each subdomain being assigned a local cell identifier that uniquely identifies the grid cell from the other grid cells of the subdomain; determining, based on the subdomains identified, domain decomposition characteristics indicative of processing overhead attributable to computations and communications for the grid cells of the subdomains; comparing the domain decomposition characteristics to the target domain decomposition parameters to determine that at least one of the of the target domain decomposition parameters is not satisfied by the domain decomposition characteristics; and in response to determining that at least one of the domain decomposition parameters is not satisfied by the domain decomposition characteristics, conducting a dynamic repartitioning operation including: determining a domain decomposition snapshot including the weight array and a global-to-local mapping, the global-to-local mapping including, for each of the grid cells of the domain, a mapping of the global cell identifier for the grid cell to the local cell identifier associated with the grid cell; determining data exchange processes of the domain decomposition; determining a reduced number of processing cores; determining, based on the data exchange processes, regrouped data exchange processes; conducting, based on the weight array, the regrouped data exchange processes and the reduced number of processing cores, an updated domain decomposition to identify updated subdomains, the number of updated subdomains corresponding to the reduced number of processing cores; distributing, based on the updated subdomains and the global-to-local mapping, weight array indices to processors of processing cores associated with the updated subdomains; determining, based on the distribution of the weight array indices, an updated connectivity graph for the domain; determining, based on the updated subdomains and the updated connectivity graph for the domain, updated domain decomposition characteristics of the update subdomains, the updated domain decomposition characteristics being indicative of processing overhead attributable to computations and communications for the grid cells of the updated subdomains; comparing the updated domain decomposition characteristics of the updated subdomains to the target domain decomposition parameters to determine that the target domain decomposition parameters are satisfied by the updated domain decomposition characteristics; and in response to determining that the domain decomposition parameters are satisfied by the updated domain decomposition characteristics, conducting the simulation of the hydrocarbon reservoir using the updated subdomains identified and the reduced number of processing cores identified, to generate a simulation of the hydrocarbon reservoir.

In some embodiments, the domain decomposition characteristics include a communication-to-computation ratio (CCR). In certain embodiments, determining data exchange processes of the domain decomposition includes: identifying the message passing interface (MPI) processes for the domain decomposition; and identifying, for each of the subdomains, a subset of the MPI processes associated with the subdomain and rakings of the MPI processes within the subset. In some embodiments, determining regrouped data exchange processes includes regrouping the MPI processes for the domain decomposition to generate regrouped MPI processes corresponding to the reduced number of processing cores. In certain embodiments, the operations include generating a field development plan (FDP) for the hydrocarbon reservoir based on the simulation of the hydrocarbon reservoir. In some embodiments, the operations include: identifying well drilling parameters based on the simulation of the hydrocarbon reservoir; and drilling a well in the hydrocarbon reservoir based on the well drilling parameters. In certain embodiments, the operations include: identifying well operating parameters based on the simulation of the hydrocarbon reservoir; and operating a well in the hydrocarbon reservoir based on the well operating parameters.

Figure 1:
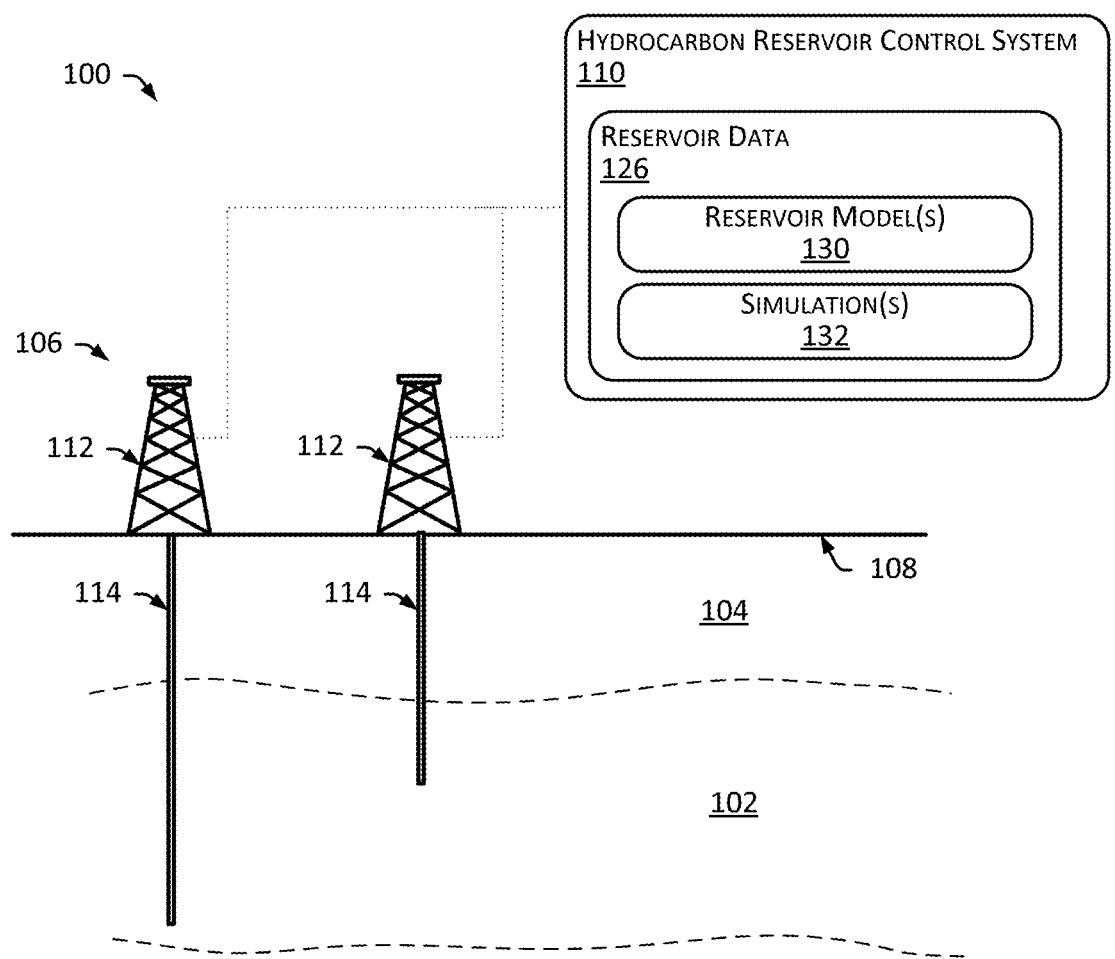
FIG. 1 is diagram that illustrates a hydrocarbon reservoir environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for computed resource hydrocarbon reservoir simulation and development. In some embodiments, a computed resource hydrocarbon reservoir simulation process includes, after processing the domain of a model to a point sufficient to determine an initial set of DD characteristics (for example, after preliminary grid calculations and initial DD operations), determining the DD characteristics of the initial DD, comparing the DD characteristics to a domain target defined by target DD parameters, and if needed, iteratively repartitioning the domain across a decreasing number of processors and reshuffling the associated weight array to achieve the domain target defined by the target DD parameters.

In some embodiments, a computed resource hydrocarbon reservoir simulation includes the following:

(1) obtaining a reservoir model for a hydrocarbon reservoir;
(2) identifying target DD parameters for simulation of the reservoir, including, for example, a threshold communication-to-computation ratio (CCR) (for example, a maximum CCR of 70:30 or 50:50);
(3) identifying a number of processing cores available for use in processing a domain of the model to generate the simulation of the reservoir;
(4) conducting a preliminary a grid calculation of the model to generate the domain of the model (the domain including, for example, grid cells representing a portion of a hydrocarbon reservoir to be simulated, where each of the grid cells has a global cell identifier that uniquely identifies the grid cell from the other grid cells of the domain);
(5) determining, for the domain, a weight array and a connectivity graph corresponding to the weight array (where the weight array includes, for example, for each grid cell of the domain, a value (or "weight") indicative of a physical property of the volume of the reservoir represented by the grid cell (such as saturation or porosity value), and where the weight of each grid cell is associated with an "index" of the weight array (such as the global cell identifier) that uniquely identifies the grid cell from the other grid cells of the domain);.
(6) conducting, based on the weight array and the connectivity graph, a DD of the domain to identify subdomains of the domain (for example, where the number of subdomains corresponds to the number of processing cores identified, and where each of the grid cells of each subdomain is assigned a local cell identifier that uniquely identifies the grid cell from the other grid cells of the subdomain);
(7) identifying, based on the subdomains, DD characteristics of the DD (for example, a CCR of the DD);
(8) comparing the DD characteristics to the target DD parameters to identify whether any of the target DD parameters are not satisfied by the DD characteristics;
(9) in response to determining that all of the DD parameters are satisfied by the DD characteristics, proceeding to conduct the simulation of the reservoir using the subdomains identified and the number of processing cores identified, to generate the simulation of the reservoir; and
(10) in response to determining that at least one of the DD parameters is not satisfied by the DD characteristics, conducting a dynamic repartitioning of the domain that includes the following:

(a) determining a "snapshot" of the current DD, including recording the weight array of the domain and a global-to-local mapping of the cell identifiers of the current DD (the global-to-local mapping including, for example, for each grid cell of the domain, a mapping of the global cell identifier of the grid cell to the current local cell identifier of the grid cell);

(b) determining data exchange processes of the current DD, including identifying all of the message passing interface (MPI) processes for the DD (for example, including recording a current MPI_COM_WORLD communicator of the current DD which identifies all current MPI process for the current DD, and identifies, for each of the subdomains, a subset of the MPI processes associated with the subdomain and rakings of the MPI processes within the subset);

(c) reducing the current number of processing cores by a given factor, to identify a reduced number of processing cores;

(d) regrouping the data exchange processes of the current DD to generate regrouped data exchange processes, including regrouping the MPI processes to generate regrouped MPI processes corresponding to the reduced number of processing cores (for example, including identifying, for each of the subdomains, a group of processors of the processing core for the subset of the processes associated with the subdomain; for each group of processors, coloring all but a last processor of the group equally; and executing a MPI_COMM_SPLIT command that results in removal of the last processor of each of the groups of processors, and creation of a new communicator that does not include the removed processors);

(e) conducting, based on the weight array, the regrouped data exchange processes and the reduced number of processing cores, an updated DD to identify updated subdomains and updated local cell identifiers (for example, including, for each of the grid cells of the domain that continues to reside in the same subdomain as before the regrouping, maintaining the assignment of the local cell identifier that uniquely identifies the grid cell from the other grid cells of the subdomain, and, for each of the grid cells that now resides in different subdomain than before the regrouping, assigning a "new" local cell identifier that uniquely identifies the grid cell from the other grid cells of the subdomain);

(f) redistributing, based on the updated subdomains and updated local cell identifiers, weight array indices to associated processing cores (for example, including, for each of the grid cells of that now resides in a different subdomain than before the regrouping and is thus assigned a "new" local cell identifier, communicating, to the processor now assigned the grid cell (for example, using MPI's remote memory access (RMA) one-side communication MPI_PUT command), the index of the weight array that corresponds to the grid cell, such that processors handling grid cells previously assigned to them continue to use the indices of those grid cells (and associated weights) without additional communication, and processors handling grid cells newly assigned to them use the indices of those grid cells communicated to them (and associated weights);

(g) conducting, based on the redistributed weight array, partitioning to generate an updated connectivity graph for the domain;

(h) return to step 7, using the updated subdomains and the updated connectivity graph for the domain, in place of the subdomains and connectivity graph previously assessed, to determine whether the DD characteristics of the updated subdomains satisfy the DD parameters.

The evaluation and dynamic repartitioning of steps 7, 8 and 10 may continue until the DD characteristics of the domain for the updated subdomains satisfy the DD parameters, at which point the simulation can be executed using the number of processing cores currently identified, to process the subdomains currently identified.

Such a technique can provide for repartitioning a domain across a decreasing number of processors, and reshuffling elements of the associated weight array to respective processors, to achieve a domain target defined by the target DD parameters. This can provide for dynamically identifying an appropriate number of computing resources after preliminary grid calculations and DD operations, and seamlessly resubmitting the simulation job using an optimal number of resources. This may enable computing resources (for example, a number of processors) to be reduced after enough information is available to make an accurate assessment, but before an unnecessarily large number of computing resources is implemented, which may otherwise reach or exceed a scalability limit.

Although some embodiments are described with regard to certain target DD parameters and corresponding DD characteristics such as CCR for the purpose illustration, embodiments can employ other target DD parameters and corresponding DD characteristics. For example, target DD parameters and corresponding DD characteristics can include some or all of the following:

(a) a cost of computation (for example, defined by a total number of grid cells of the domain (or "local grid cells")); (b) a cost of communication (for example, defined by a total number of grid cells at the boundaries of the subdomains of the domain); (c) CCR (for example, defined by the cost of communication divided by the cost of communication); (d) a total cost of computation and communication (for example, defined by a sum of the cost of communication and the cost of communication); (e) a volume of inter-domain communication (for example, defined by the number of grid cells that are communicated between the processing cores, which are the grid cells of subdomains sharing boundaries that are processed by different processing cores); (f) a volume of intra-domain communication (for example, defined by a number of grid cells that are communicated between the processing cores, which are the grid cells of subdomains sharing boundaries that are processed by the same processing cores; (g) a ratio of volume of inter-domain communication to intra-domain communication (for example, defined by the volume of inter-domain communication dived by the volume of intra-domain communication); and (h) a number of neighboring processes (for example, defined by subdomains (or processing cores) that share boundaries with each other).

Although some embodiments are described that include reducing the number of processing cores by a given factor (for example, reducing the number of processing cores by one), embodiments can employ other methods to identify a suitable number of processing cores. In some embodiments, a binary search can be implemented. For example, if the DD parameters are not met, instead of reducing the number of processing cores by one, half the number of processing cores can be used, and if the DD parameters are met, then the algorithm can increase the number of processing cores to half of the upper half. If the DD parameters are not met, then the algorithm can decrease the number of processing cores to half of the lower half. Such an iterative binary search approach may continue until the DD parameters are met.

FIG. 1 is a diagram that illustrates a hydrocarbon reservoir environment ("reservoir environment") 100 in accordance with one or more embodiments. In the illustrated embodiment, the reservoir environment 100 includes a hydrocarbon reservoir ("reservoir") 102 located in a subsurface formation ("formation") 104, and a hydrocarbon reservoir development system 106.

The formation 104 may include a porous or fractured rock formation that resides underground, beneath the Earth's surface ("surface") 108. The reservoir 102 may include a portion of the formation 104 that contains (or that is determined or expected to contain) a subsurface pool of hydrocarbons, such as oil and gas. The formation 104 and the reservoir 102 may each include different layers of rock having varying characteristics, such as varying degrees of permeability, porosity and fluid saturations. The hydrocarbon reservoir development system 106 may facilitate the extraction (or "production") of hydrocarbons from the reservoir 102.

In some embodiments, the hydrocarbon reservoir development system 106 includes a hydrocarbon reservoir control system ("control system") 110 and one or more wells 112. In some embodiments, the control system 110 includes a computer system that is the same as or similar to that of computer system 1000 described with regard to at least FIG. 7. Each of the wells 112 may be defined by a wellbore 114 that extends from the surface 108 into a target zone of the formation 104, such as the reservoir 102. The wellbore 114 may be created, for example, by a drill bit boring along a path (or "trajectory") through the formation 104 and the reservoir 102.

In some embodiments, the control system 110 controls various operations for development of the reservoir 102. For example, the control system 110 may control logging operations used to acquire data for the reservoir 102, or control processing that generates models and simulations characterizing the reservoir 102, based on the data acquired. In some embodiments, the control system 110 determines drilling parameters or operating parameters for wells 112 in the reservoir 102, or controls drilling or operating of the wells 112, in accordance with drilling or operating parameters. This can include, for example, the control system 110 determining drilling parameters (for example, determining well locations and trajectories) for the reservoir 102, controlling drilling of the wells 112 in accordance with the drilling parameters (for example, controlling a well drilling system of the hydrocarbon reservoir development system 106 to drill the wells 112 in accordance at the well locations and trajectories), determining operating parameters (for example, determining production rates and pressures for "production" wells 112 and injection rates and pressure for "injections" wells 112), and controlling operations of the wells 112 in accordance with the operating parameters (for example, controlling a well operating system of the hydrocarbon reservoir development system 106 to operate the production wells 112 to produce hydrocarbons from the reservoir 102 in accordance with the production rates and pressures determined for the respective wells 112, and controlling the injection wells 112 to inject substances, such as water, into the reservoir 102 in accordance with the injection rates and pressures determined for the respective wells 112). In some embodiments, the control system 110 determines monitoring parameters or controls operations of monitoring wells 112 accordingly. For example, the control system 110 may determine wellbore logging parameters for monitoring wells 112, and control logging tools and sensors within the wellbores 114 of the monitoring wells 112 in accordance with the wellbore logging parameters for the respective monitoring wells 112.

In some embodiments, the control system 110 stores in a memory, or otherwise has access to, reservoir data 126. The reservoir data 126 may include data that is indicative of properties of the reservoir 102. In some embodiments, the reservoir data 126 includes one or more models 130 of the reservoir 102, or one or more simulations 132 of the reservoir 102, such as a computed resource hydrocarbon reservoir simulation described here. A model 130 of the reservoir 102 may include data representing properties of a portion of the reservoir 102. A domain of the model 130 may include a three-dimensional (3D) grid of cells (or "grid cells") representing a portion of the reservoir 102. Each of the cells may include a cubic, or similar shaped, cell that represents a corresponding volume within the reservoir 102, and that is associated with properties of that volume within the reservoir 102. This can include properties of the volume itself, such as a fluid saturation or porosity of the volume within the reservoir 102, as well as interfaces with adjacent cells, such as fluxes representing a fluid interchange between the cell and respective ones of the other cells directly adjacent the cell (for example, the surrounding cells having a face abutting the respective faces of the cell). The properties of the model 130 may be determined based on data acquired for the reservoir 102, such as seismic logs of the reservoir 102, downhole logs of wells already drilled into the reservoir 102, data acquired from core samples extracted from the reservoir 102, or recorded data for reservoirs having characteristics similar to those of the reservoir 102. The properties of the cells of the domain of the model 130 may be determined by way of a grid calculation of the model 130. In some instances, inactive cells identified in the grid calculation, are compressed out, leaving only active cells in the domain of the model 130.

In some instances, a domain of a model 130 is represented in "graph form." This can include each of the cells of the domain being represented by a vertex of a graph, and each of the respective interfaces between pairs of adjacent cells of the domain being represented by an edge of the graph, that extends between the respective vertices representing the cells of the pair of adjacent cells. In such a representation, each vertex may be associated with (or be defined by) properties of the respective cell, such as a water saturation or porosity of the volume of the reservoir represented by the cell corresponding to the vertex. Each of the edges may be associated with (or be defined by) properties of the corresponding interface between the respective cells of the pair of adjacent cells defining the vertices at the ends of the edge, such as fluid flux between the pair of adjacent cells defining the vertices at the ends of the edge.

Figure 2:
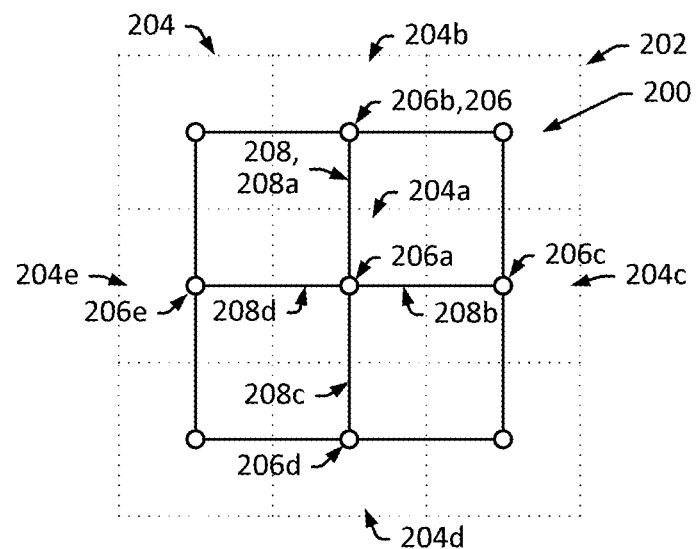
FIG. 2 is a diagram that illustrates a two-dimensional representation of a portion of a domain of a model of a hydrocarbon reservoir in accordance with one or more embodiments.

FIG. 2 is a diagram that illustrates a two-dimensional (2D) representation of a portion of a domain of a model in accordance with one or more embodiments. The illustrated embodiment includes a graph form 200 of a portion of a domain overlaid onto a grid form 202 of the domain. The grid form 202 including a plurality of grid cells ("or cells") 204 representing respective cubic volumes of a reservoir, and the graph form 200 including a plurality of vertices 206 associated with respective ones of the cells 204, and edges 208 each associated with a respective interface between adjacent cells 204. For example, in illustrated embodiment, a 2D representation of the first cell 204a is surrounded by four adjacent cells 204b, 204c, 204d and 204e (top, right, bottom and left of the first cell 204a, respectively) that each share a face with the first cell 204a. The vertices 206 (vertices 206a, 206b, 206c, 206d and 206e) may be associated with properties, such as fluid saturation or porosity, of the respective volumes of the cells 204a, 204b, 204c, 204d and 204e. The edges 208 (edges 208a, 208b, 208c, and 208d) may be associated with interchange properties, such as fluid flux, between the cell 204a and respective ones of the adjacent cells 204b, 204c, 204d and 204e. Although the illustration is provided in two dimensions for the purpose of explanation, when considered in three dimensions, the property for each of the cells interchange properties, such as fluid flux between the cell 204a and a given one of the adjacent cells 204b, 204c, 204d and 204e may represent the interchange across the face between the two cells, such as the flow of fluid across the 2D face shared by the two cells. Further, when considered in three dimensions and relative to the plane of FIG. 2, the first cell 204a may be adjacent two additional cells, including a cell in front of the first cell 204a and a cell behind the first cell 204a. Each of these two cells may be represented by a corresponding vertex, and the interface between the first cell 204a and each of the two cells may be represented by a corresponding edge. In the case of partitioning of a domain, graph partitioning software (such as METIS software, described for example in "A Fast and Highly Quality Multilevel Scheme for Partitioning Irregular Graphs". George Karypis and Vipin Kumar. SIAM Journal on Scientific Computing, Vol. 20, No. 1, pp. 359-392, 1999), the edge and vertex of the connection associated with each graph node may be assigned a weight (for example, a weight in the range of 1 to 1,000/10,000). In hydrocarbon reservoir simulation and partitioning, the weights for vertices and edges may be based on corresponding physical properties and information, such as transmissibility, flux values, and number of active cells in the domain. These weights for vertices and edges may be defined in a weight array for the domain, which can be provided as an input to the partitioning software. The partitioning software may output a corresponding connectivity graph for the resulting partitions, identifying vertices and edges for the domain, including connections of subdomains to each other and connections of grid cells.

A simulation 132 of the reservoir 102 (or "reservoir simulation") may include data that includes a prediction of movement of fluids, such as water or hydrocarbons, within the reservoir 102, over time. In some embodiments, a simulation 132 of the reservoir 102 is generated based on a model 130 of the reservoir 102. For example, a simulation 132 may include a snapshot of where fluid is expected to be within the reservoir 102 one year from now, based on a model 130 that indicates present characteristics of the reservoir 102 (such as the current location of water and hydrocarbons in the reservoir 102) and expected operating conditions for the wells 112 in the reservoir 102 over the next year (such as operating parameters for wells 112 in the reservoir 102 over the next year). In some embodiments, a simulation 132 includes a sequence of snapshots over time, that demonstrates the predicted movement of the fluids within the reservoir 102 at different times (for example, at year one, at year two, and at year three). Simulations 132 may be used to determine how to develop the reservoir 102. For example, a simulation 132 of the reservoir 102 may be used to determine drilling or operating parameters for wells 112 in the reservoir 102.

As described here, a model 130 may be processed to generate one or more simulations of the reservoir 102. In some embodiments, a model 130 is used in a computed resource hydrocarbon reservoir simulation process to generate a simulation of the reservoir 102. As described, in some embodiments, the computed resource hydrocarbon reservoir simulation process includes, after processing the domain of a model 130 to a point sufficient to determine an initial set of DD characteristics (for example, after preliminary grid calculations and initial DD operations), determining the DD characteristics of the initial DD, comparing the DD characteristics to a domain target defined by target DD parameters, and if needed, iteratively repartitioning the domain across a decreasing number of processors and reshuffling the associated weight array to achieve the domain target defined by the target DD parameters.

Figure 3:
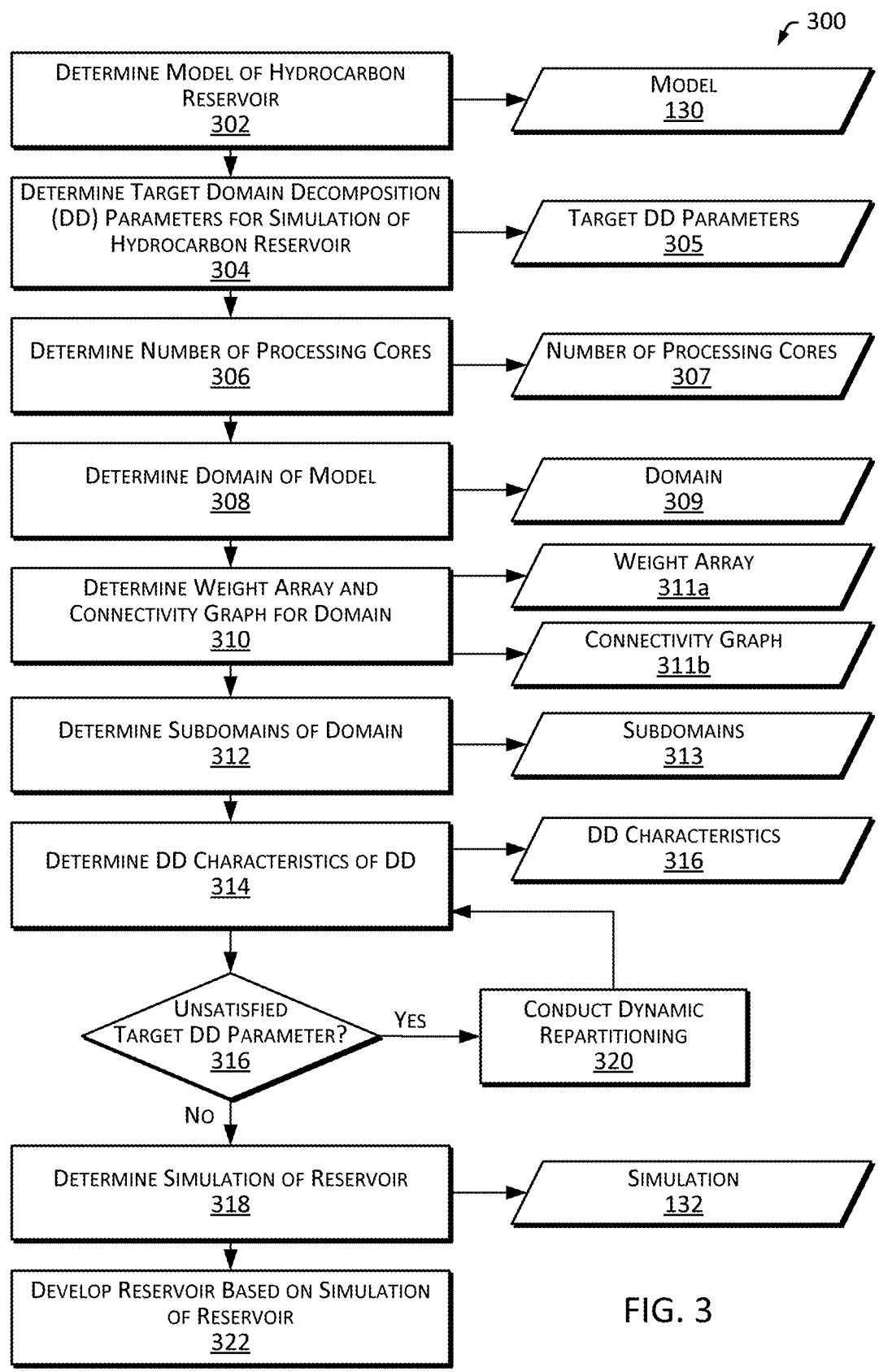
FIG. 3 is a flowchart that illustrates an example method of developing a hydrocarbon reservoir in accordance with one or more embodiments.

FIG. 3 is a diagram that illustrates a method 300 of computed resource hydrocarbon reservoir simulation and development in accordance with one or more embodiments. Some or all of the procedural elements of method 300 may be performed, for example, by the control system 110 or another reservoir operator. In some embodiments, the data generated by the procedural elements of method 300 may be stored in a memory, such as that of the control system 110, or displayed, such as on a graphical user interface of the control system 110.

In some embodiments, the method 300 includes determining a reservoir model of a hydrocarbon reservoir (block 302). Determining a reservoir model of a hydrocarbon reservoir may include obtaining data representing a portion of the reservoir. For example, determining a reservoir model of a hydrocarbon reservoir may include the control system 110 generating, retrieving or otherwise obtaining, a model 130 including data defining properties of a 3D volume of a given portion of the reservoir 102.

In some embodiments, the method 300 includes determining target domain decomposition DD parameters for simulation of the hydrocarbon reservoir (block 304). Determining target DD parameters for simulation of the hydrocarbon reservoir may include identifying a set of DD parameters that are to be used a guide for assessing results of DD of the domain of the model of the hydrocarbon reservoir. For example, determining target DD parameters for simulation of the hydrocarbon reservoir may include the control system 110 generating, retrieving or otherwise obtaining (for example, from a user), target DD parameters 305 including a target value for some or all of the following: (a) a threshold cost of computation; (b) a threshold cost of communication; (c) a threshold communication-to-computation ratio (CCR); (d) a threshold total cost of computation and communication; (e) a threshold volume of inter-domain communication; (f) a threshold volume of intra-domain communication; and (g) a threshold ratio of volume of inter-domain communication to intra-domain communication.

In some embodiments, the method 300 includes determining a number of processing cores (block 306). Determining a number of processing cores may include identifying a number of processing cores available for use in processing the domain of the model to generate the simulation of the hydrocarbon reservoir. For example, determining a number of processing cores may include the control system 110 determining, retrieving or otherwise obtaining (for, example, from a user) a maximum number of processing cores 307 (or associated processors) for use in processing a domain of the model 130 to generate a simulation 132 of the reservoir 102.

In some embodiments, the method 300 includes determining a domain of the model (block 308). Determining a domain of the model may include conducting a preliminary a grid calculation of the model of the hydrocarbon reservoir to generate a domain of the model. For example, determining a domain of the model may include the control system 110 conducting a preliminary a grid calculation of the model 130 to generate a domain 309 of the model 130, where the domain 309 includes cells 204 representing a portion of the hydrocarbon reservoir 102 to be simulated, and where each of the cells 204 has a global cell identifier that uniquely identifies the cell 204 from the other cells 204 of the domain 309 of the model 130.

In some embodiments, the method 300 includes determining a weight array and a connectivity graph for the domain (block 310). Determining a weight array for the domain may include determining a weight array that includes, for each cell of the domain, a value (or "weight") (such as saturation or porosity value), where the weight of each grid cell is associated with an "index" of the weight array (such as the global cell identifier) that uniquely identifies the grid cell from the other grid cells of the domain. Determining a connectivity graph for the domain may include determining, based on the weights of the cells identified in the weight array, a connectivity graph corresponding to the weight array for the domain. For example, determining a weight array for the domain of the model may include the control system 110 determining a weight array 311a including, for each cell 204 of the domain 309 of the model 130, a weight (such as saturation or porosity value), where the weight of the cell 204 is associated with an index of the weight array 311a (such as the global cell identifier) that uniquely identifies the cell 204 from the other cells 204 of the domain 309. Determining a connectivity graph for the domain may include the control system 110 determining, based on the weights of the grid cells identified in the weight array 311a, a connectivity graph 311b for the domain 309 that corresponds to the weight array for the domain.

In some embodiments, the method 300 includes determining subdomains of the domain (block 312). Determining subdomains of the domain may include conducting, based the weight array and connectivity graph for the domain, a DD of the domain to identify subdomains of the domain. For example, determining subdomains of the domain may include the control system 110 conducting, based the weight array 311a and the connectivity graph 311b, a DD of the domain 309 to identify subdomains 313 of the domain 309 of the model 130, where the number of subdomains 313 identified corresponds to the number of processing cores 307, and where each of the cells 204 of each subdomain of the subdomains 313 is assigned a local cell identifier that uniquely identifies the cell 204 from the other cells 204 of the subdomain.

In some embodiments, the method 300 includes determining DD characteristics of the domain decomposition (block 314). Determining DD characteristics of the DD may include identifying DD characteristics of the subdomains identified by the DD. The domain decomposition characteristics may be indicative of estimated processing overhead attributable to computations and communications for the cells of the subdomains identified by the DD. For example, determining DD characteristics may include the control system 110 identifying, for the subdomains 313, DD characteristics 316 including some or all of the following: (a) a number of local grid cells (identifying a cost of computation); (b) a number of communicated grid cells (identifying cost of communication); (c) a communication-to-computation ratio (CCR); (d) a total cost of computation and communication; (e) a volume of inter-domain communication; (f) a volume of intra-domain communication; (g) a ratio of volume of inter-domain communication to intra-domain communication; and (h) a number of neighboring processes.

In some embodiments, the method 300 includes determining whether any of the target DD parameters are not satisfied by the DD characteristics (block 316). Determining whether any of the target DD parameters are not satisfied (or "unmet") by the DD characteristics may include comparing the DD characteristics to the target DD parameters to identify whether any of the target DD parameters are not satisfied by the DD characteristics. For example, determining whether any of the DD parameters are not satisfied by the DD characteristics may include the control system 110 comparing the DD characteristics 316 to the target DD parameters 305 for the simulation of the reservoir 102, to identify whether any of the target DD parameters 305 are not satisfied by the DD characteristics 316 (for example, at least one of the specified thresholds of the target DD parameters 305 is exceeded by a value of a corresponding one of the DD characteristics 316).

In some embodiments, the method 300 includes, in response to determining that all of the target DD parameters are satisfied by the DD characteristics, determining a simulation of the reservoir (block 318). Determining a simulation of the reservoir may include proceeding to conduct a simulation of the reservoir using the subdomains and the number of processing cores currently identified, to generate a simulation 132 of the reservoir. For example, determining a simulation of the reservoir may include the control system 110 proceeding to conduct a simulation of the reservoir 102 using the subdomains 313 and the number of processing cores 307 currently identified (for example, using the subdomains 313 and the number of processing cores 307 currently identified corresponding to the DD characteristics that satisfy the target DD parameters 305), to generate a simulation 132 of the reservoir 102. The simulation 132 of the reservoir 102 may include a prediction of movement of fluids, such as water or hydrocarbons, within the reservoir 102, over time. The simulation 132 may be, for example, a 1-year simulation generated based on data from Jan. 1, 2019, including a prediction of where fluids, such as water or hydrocarbons, will be located within the portion of the reservoir 102 corresponding to the model 130, on Jan. 1, 2020.

In some embodiments, the method 300 includes, in response to determining that at least one of the DD parameters is not satisfied by the DD characteristics, conducting a dynamic repartitioning of the domain (block 320). Conducting a dynamic repartitioning of the domain may include a repartitioning of the domain across a decreased number of processors and reshuffling the associated weight array, to generate updated subdomains (and an updated connectivity graph) that are used in place of the of the subdomains and connectivity graph previously assessed (for example, at block 314). This may be repeated until the domain target defined by the target DD parameters is achieved, at which point the method 300 may proceed to conducting a simulation of the reservoir (block 318), for example, using the updated subdomains and the corresponding number of processing cores identified, to generate the simulation 132 of the reservoir 102.

Figure 4:
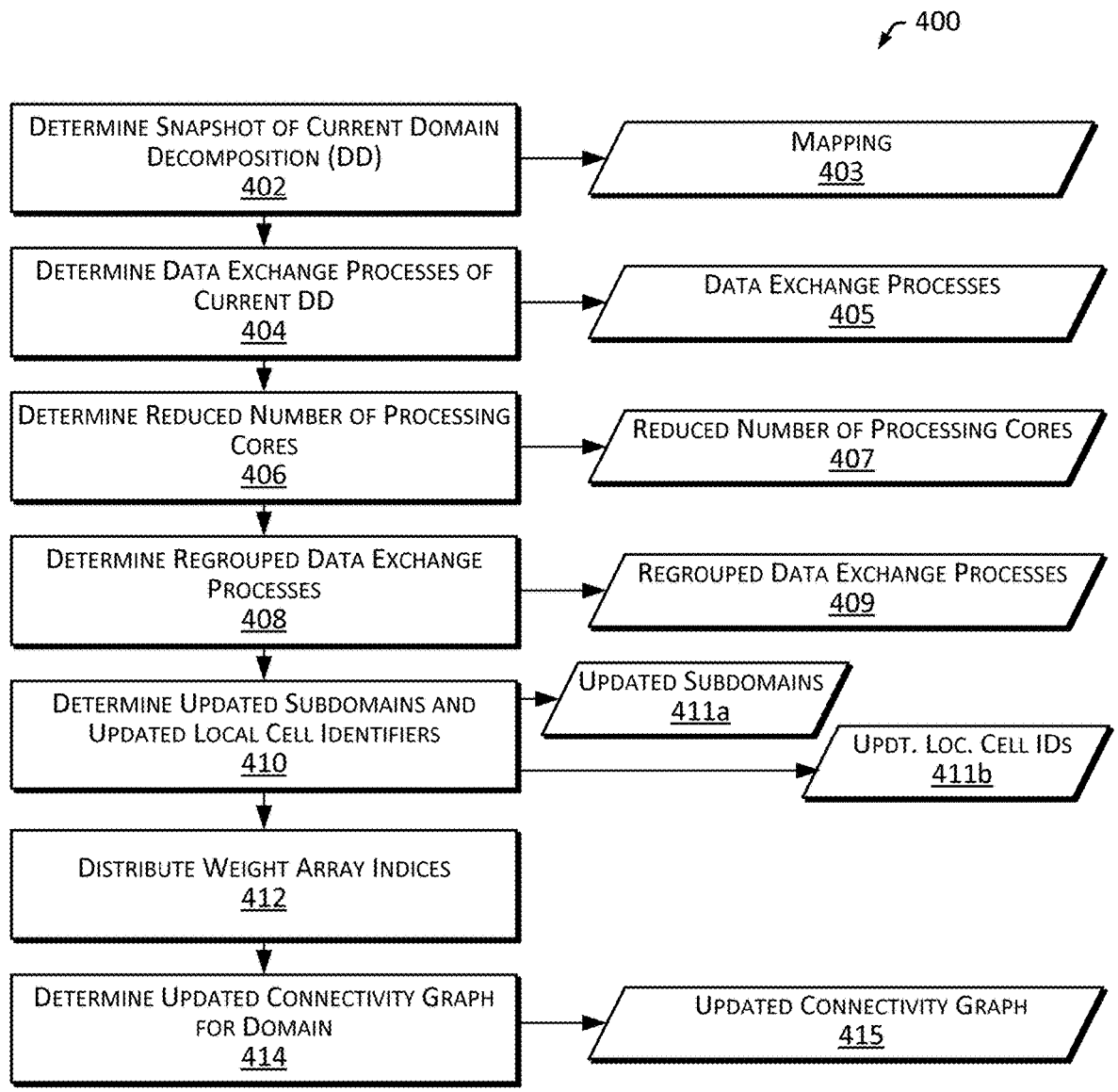
FIG. 4 is a flowchart that illustrates an example method of dynamic repartitioning in accordance with one or more embodiments.

FIG. 4 is a flowchart that illustrates an example method 400 of dynamic repartitioning (such as that described with regard to block 320) in accordance with one or more embodiments.

In some embodiments, the method 400 includes determining a "snapshot" of the current DD (block 402). Determining a "snapshot" of the current DD may include recording the weight array of the domain and a global-to-local mapping of the cell identifiers of the current DD. For example, determining a "snapshot" of the current DD may include the control system 110 recording the weight array 311a of the domain 309 and a global-to-local mapping of the cell identifiers 403 of the current DD (for example, including, for each cell 204 of the domain 309, a mapping of the global cell identifier of the cell 204 to the current local cell identifier of the cell 204).

In some embodiments, the method 400 includes determining data exchange processes of the current DD (block 404). Determining data exchange processes of the current DD may include identifying all of the message passing interface (MPI) processes for the current DD, as well as, for each of the subdomains, a subset of the MPI processes associated with the subdomain and rakings of the MPI processes within the subset. For example, determining data exchange processes of the current DD may include the control system 110 determining data exchange processes 405, including a recording of a current MPI_COM_WORLD communicator of the DD which identifies all current MPI process for the current DD, and identifies, for each of the subdomains, a subset of the MPI processes associated with the subdomain and rakings of the MPI processes within the subset.

In some embodiments, the method 400 includes determining a reduced number of processing cores (block 406). Determining a reduced number of processing cores may include reducing the current number of processing cores identified by a given factor to identify a reduced number of processing cores (or associated processors). For example, determining a reduced number of processing cores may include the control system 110 reducing the current number of processing cores identified by a given factor (for example, a reduction by a factor of 1, to identify one less processing core) to identify a reduced number of processing cores 407. In some embodiments, the method 400 includes determining regrouped data exchange processes (block 408). Determining regrouped data exchange processes may include regrouping the data exchange processes for the current DD to generate regrouped data exchange processes. For example, determining regrouped data exchange processes may include the control system 110 regrouping the MPI processes of data exchange processes 405 to generate regrouped data exchange processes 409 that include a regrouping of the MPI processes corresponding to the reduced number of processing cores 407. This may include the following: identifying, for each of the subdomains, a group of processors of the processing core for the subset of the processes associated with the subdomain; for each group of processors, coloring all but a last processor of the group equally; and executing a MPI_COMM_SPLIT command that results in removal of the last processor of each of the groups of processors, and creation of a new communicator that does not include the removed processors.

In some embodiments, the method 400 includes determining updated subdomains and updated local cell identifiers (block 410). Determining updated subdomains and updated local cell identifiers may include conducting, based on the weight array, the regrouped data exchange processes and the reduced number of processing cores, an updated DD to identify updated subdomains and corresponding updated local cell identifiers. For example, determining updated subdomains and updated local cell identifiers may include the control system 110, determining updated subdomains 411a and updated local cell identifiers 411b for the updated subdomains 411a, where, for each of the cells 204 that continues to reside in the same domain as before the regrouping, maintaining the assignment of the local cell identifier that uniquely identifies the cell 204 from the other cells 204 of the subdomain, and, for each of the cells 204 that now resides in different subdomain than before the regrouping, assigning a "new" local cell identifier that uniquely identifies the cell 204 from the other cells 204 of the subdomain.

Figure 5:
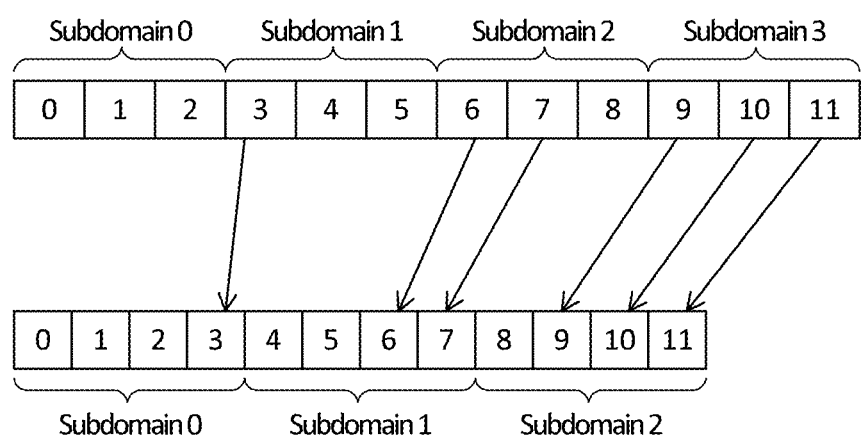
FIG. 5 is a diagram that illustrates an example of one-sided communication used to reshuffle distributed arrays from an old processor distribution to a new processor distribution in accordance with one or more embodiments.

In some embodiments, the method 400 includes distributing weight array indices (block 412). Distributing weight array indices may include redistributing, based on the updated subdomains and updated local cell identifiers, weight array indices to associated processing cores (or associated processors). This may include, for each of the grid cells of that now resides in a different subdomain than before the regrouping, and is thus assigned a "new" local cell identifier, communicating, to the processing core (or specific processor) now assigned the cell, the index of the weight array that corresponds to the cell, such that processing cores (or processors) handling previously assigned cells continue to use the indices of those cells (and associated weights) without additional communication, and processing cores (or processors) handling newly assigned cells use the indices of those cells communicated to them (and associated weights of the cells). For example, distributing weight array indices may include the control system 110, for each of the cells 204 of that now resides in a different subdomain than before the regrouping, and is thus assigned a "new" local cell identifier, communicating, to the processing core (or processor) now assigned the cell 204 (for example, using MPI's RMA one-side communication MPI_PUT command), the index of the weight array 311a that corresponds to the cell 204. FIG. 5 is a diagram that illustrates an example of one-sided communication used to reshuffle distributed arrays from an old processor distribution to a new processor distribution, in accordance with one or more embodiments. As illustrated weight array indices for cells that are assigned to a "new" subdomains (for example, indices 3, 6, 7, 8, 9, 10 and 11) are communicated from the "old" subdomain to which they were previously assigned to the "new" subdomain to which they are currently assigned.

In some embodiments, the method 400 includes determining an updated connectivity graph for the domain (block 414). Determining an updated connectivity graph for the domain may include partitioning, based on the redistributed weight array indices, to generate an updated connectivity graph 415 for the domain. For example, determining an updated connectivity graph for the domain may include the control system 110, generating, based on the updated subdomains 411a and associated redistributed weight array indices, an updated connectivity graph for the domain 309. This may include providing the updated weight array to partitioning software (such as METIS), and the partitioning software conducting a partitioning based on the updated weight array, and generating the updated connectivity graph for the domain 309.

As described, the updated subdomains and updated connectivity graph may be used in place of the of the subdomains and connectivity graph previously assessed (for example, updated subdomains 411a and updated connectivity graph 415 may be used in place of subdomains 313 and connectivity graph 311b) to determine whether the DD characteristics 316 of the updated subdomains 411a satisfy the target DD parameters 305. This may iterative repartitioning with a reduced number of processing cores may be repeated until the domain target defined by the target DD parameters (for example, target DD parameters 305) is achieved, at which point the method 300 may proceed to conducting a simulation of the reservoir (block 318), for example, using the updated subdomains 411a currently identified and the corresponding reduced number of processing cores 407 currently identified, to generate the simulation 132 of the reservoir 102.

Returning to method 300, in some embodiments, the method 300 includes developing the reservoir based on the simulation of the reservoir (block 322). Developing the reservoir based on the simulation of the reservoir may include defining or conducting various operations for development of the reservoir based on the simulation of the reservoir. For example, developing the reservoir 102 based on the simulation 132 of the reservoir 102 may include the control system 110 or (another operator of the reservoir 102) determining drilling parameters or operating parameters for wells 112 in the reservoir 102, or controlling drilling or operating of the wells 112 in accordance with the drilling or operating parameters. In some embodiments, FDP may be generated for the reservoir 102, based on the on the simulation 132 of the reservoir 102. For example, the control system 110 or (another operator of the reservoir 102) may generate a FDP that specifies parameters for developing the reservoir 102, such as the drilling parameters or operating parameters for wells 112 in the reservoir 102 in 2019, based on the on the simulation 132 that indicates predicted fluid movement in the portion of the reservoir 102 represented by the model 130, from Jan. 1, 2019 to Jan. 1, 2020.

Figure 6A:
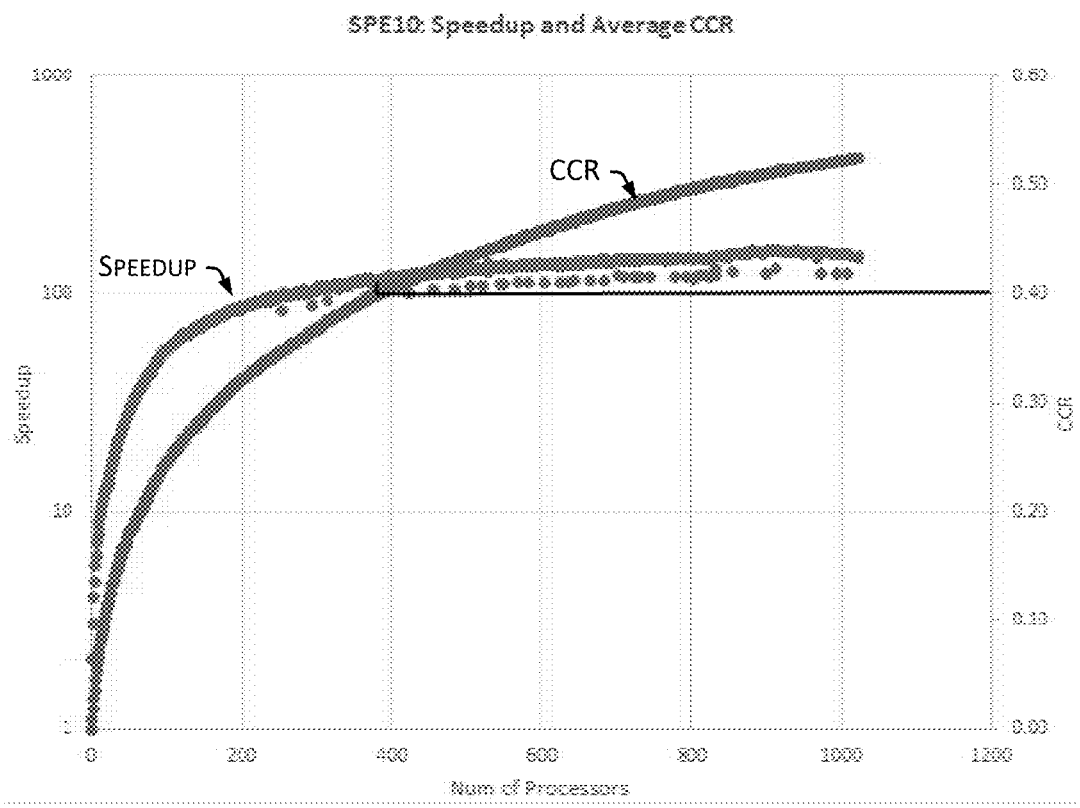
FIGS. 6A and 6B are diagrams that illustrate speed up and average communication-to-computation ratio versus numbers of processors in accordance with one or more embodiments.
Figure 6B:
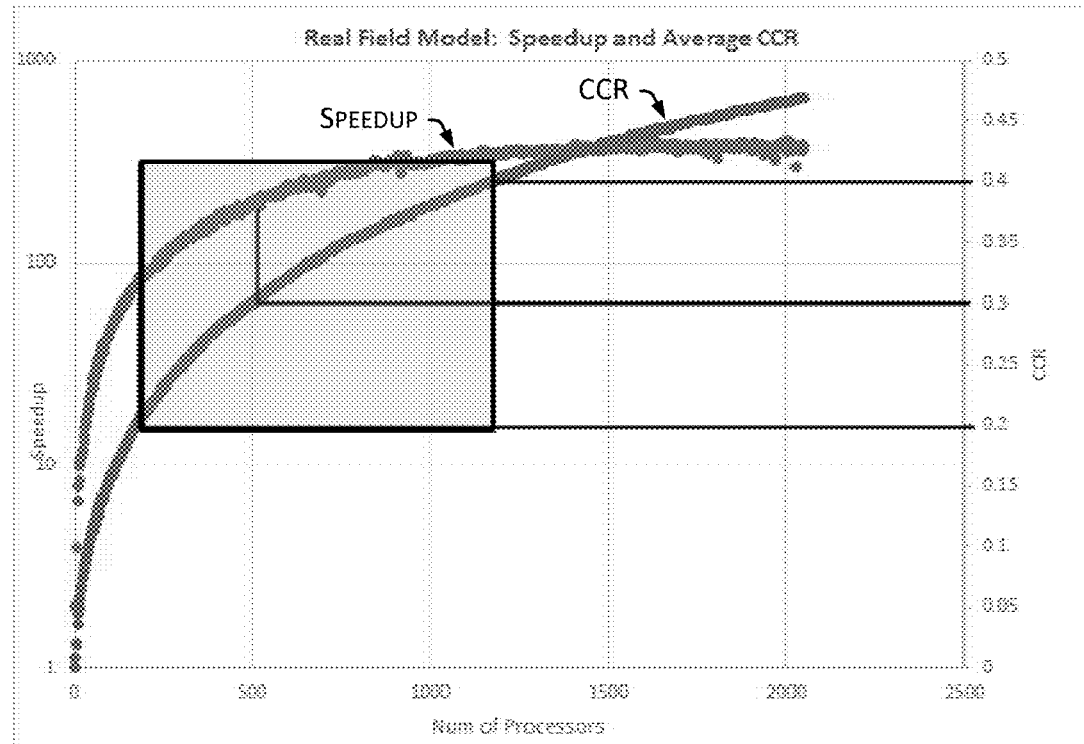

The techniques described here can be used to identify and employ an optimal amount of processing resources for hydrocarbon reservoir simulation. FIGS. 6A and 6B are diagrams that illustrate a factor of speed increase (or "speedup") and CCR versus numbers of processing cores (or "num of processors"), for the $10^{th}$ SPE Comparative Solution Project (SPE10) and Real Field Model, respectively, in accordance with one or more embodiments. FIGS. 6A and 6B demonstrate that once the CCR is greater than about 0.4 in both cases, the gain in speed by adding more processors is not as significant as for reduced CCRs associated with fewer processing cores, indicating a decrease in return on computing resource investment. Thus, it may be advisable to set a threshold CCR to about 0.4. If the threshold CCR is set to about 0.4, using the techniques described here, it may be determined that about 380 processing cores should be for simulations associated with the SPE10, and about 1,150 processing cores should be for simulations associated with the Real Field Model.

Figure 7:
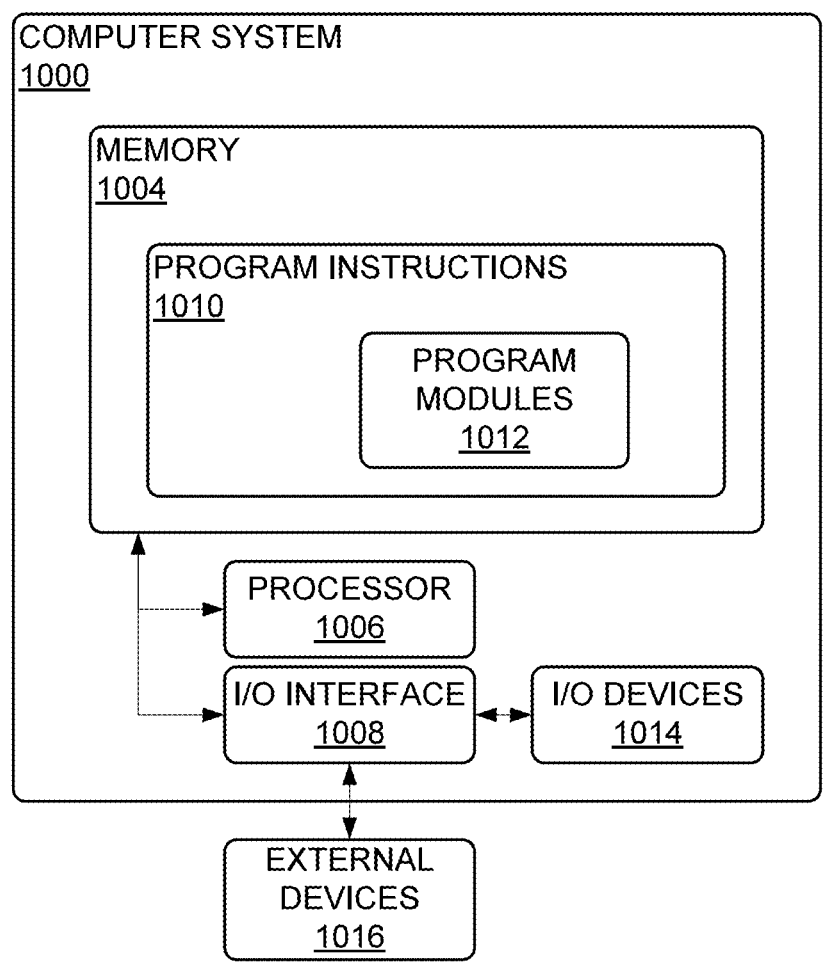
FIG. 7 is a diagram that illustrates an example computer system in accordance with one or more embodiments.

FIG. 7 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored on the medium. The program instructions 1010 may include program modules 1012 that are executable by a computer processor (for example, the processor 1006) to cause the functional operations described, such as those described with regard to the control system 110, the method 300 or the method 400.

The processor 1006 may be any suitable processor capable of executing program instructions. The processor 1006 may include one or more processors that carry out program instructions (for example, the program instructions of the program modules 1012) to perform the arithmetical, logical, or input/output operations described. The processor 1006 may include multiple processors that can be grouped into one or more processing cores that each include a groping of one or more processors that are used for executing the processing described here, such as the parallel processing of subdomains to generate a simulation of a reservoir. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016, such as sensors, valves, pumps, motors, computers or communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted or modified. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method comprising:
    determining a model of a hydrocarbon reservoir;
    determining target domain decomposition parameters for a simulation of the hydrocarbon reservoir;
    determining an initial number of processing cores for processing the simulation of the hydrocarbon reservoir;
    conducting a preliminary grid calculation of the model of the hydrocarbon reservoir to determine a domain of the model of the hydrocarbon reservoir, the domain comprising grid cells representing a portion of the hydrocarbon reservoir, where each of the grid cells of the domain has a global cell identifier that uniquely identifies the grid cell from the other grid cells of the domain;
    determining a weight array for the domain, the weight array comprising, for each grid cell of the domain:
        a weight indicative of a physical property of the portion of the hydrocarbon reservoir corresponding to the grid cell; and
        an index that uniquely identifies the grid cell from the other grid cells of the domain;
    determining a connectivity graph that corresponds to the weight array;
    conducting, based the weight array and the connectivity graph, a DD of the domain to identify subdomains of the domain, the number of subdomains corresponding to the number of processing cores, and each of the grid cells of each subdomain being assigned a local cell identifier that uniquely identifies the grid cell from the other grid cells of the subdomain;
    determining, based on the subdomains identified, domain decomposition characteristics indicative of processing overhead attributable to computations and communications for the grid cells of the subdomains;
    comparing the domain decomposition characteristics to the target domain decomposition parameters to determine that at least one of the of the target domain decomposition parameters is not satisfied by the domain decomposition characteristics; and in response to determining that at least one of the domain decomposition parameters is not satisfied by the domain decomposition characteristics, conducting a dynamic repartitioning operation comprising:
  determining a domain decomposition snapshot comprising the weight array and a global-to-local mapping, the global-to-local mapping comprising, for each of the grid cells of the domain, a mapping of the global cell identifier for the grid cell to the local cell identifier associated with the grid cell;
  determining data exchange processes of the domain decomposition;
  determining a reduced number of processing cores;
  determining, based on the data exchange processes, regrouped data exchange processes;
  conducting, based on the weight array, the regrouped data exchange processes and the reduced number of processing cores, an updated domain decomposition to identify updated subdomains, the number of updated subdomains corresponding to the reduced number of processing cores;
  distributing, based on the updated subdomains and the global-to-local mapping, weight array indices to processors of processing cores associated with the updated subdomains;
  determining, based on the distribution of the weight array indices, an updated connectivity graph for the domain;
  determining, based on the updated subdomains and the updated connectivity graph for the domain, updated domain decomposition characteristics of the update subdomains, the updated domain decomposition characteristics being indicative of processing overhead attributable to computations and communications for the grid cells of the updated subdomains;
  comparing the updated domain decomposition characteristics of the updated subdomains to the target domain decomposition parameters to determine that the target domain decomposition parameters are satisfied by the updated domain decomposition characteristics; and
in response to determining that the domain decomposition parameters are satisfied by the updated domain decomposition characteristics, conducting the simulation of the hydrocarbon reservoir using the updated subdomains identified and the reduced number of processing cores identified, to generate a simulation of the hydrocarbon reservoir.

2. The method of claim 1, wherein the domain decomposition characteristics comprise a communication-to-computation ratio (CCR).

3. The method of claim 1, wherein determining data exchange processes of the domain decomposition comprises:
  identifying the message passing interface (MPI) processes for the domain decomposition; and
  identifying, for each of the subdomains, a subset of the MPI processes associated with the subdomain and rakings of the MPI processes within the subset.

4. The method of claim 3, wherein determining regrouped data exchange processes comprises regrouping the MPI processes for the domain decomposition to generate regrouped MPI processes corresponding to the reduced number of processing cores.

5. The method of claim 1, further comprising generating a field development plan (FDP) for the hydrocarbon reservoir based on the simulation of the hydrocarbon reservoir.

6. The method of claim 1, further comprising:
identifying well drilling parameters based on the simulation of the hydrocarbon reservoir; and
drilling a well in the hydrocarbon reservoir based on the well drilling parameters.

7. The method of claim 1, further comprising:
identifying well operating parameters based on the simulation of the hydrocarbon reservoir; and
operating a well in the hydrocarbon reservoir based on the well operating parameters.

8. A non-transitory computer readable storage medium comprising program instructions stored thereon that are executable by a processor to perform the following operations:
  determining a model of a hydrocarbon reservoir;
  determining target domain decomposition parameters for a simulation of the hydrocarbon reservoir;
  determining an initial number of processing cores for processing the simulation of the hydrocarbon reservoir;
  conducting a preliminary grid calculation of the model of the hydrocarbon reservoir to determine a domain of the model of the hydrocarbon reservoir, the domain comprising grid cells representing a portion of the hydrocarbon reservoir, where each of the grid cells of the domain has a global cell identifier that uniquely identifies the grid cell from the other grid cells of the domain;
  determining a weight array for the domain, the weight array comprising, for each grid cell of the domain:
    a weight indicative of a physical property of the portion of the hydrocarbon reservoir corresponding to the grid cell; and
    an index that uniquely identifies the grid cell from the other grid cells of the domain;
  determining a connectivity graph that corresponds to the weight array;
  conducting, based the weight array and the connectivity graph, a DD of the domain to identify subdomains of the domain, the number of subdomains corresponding to the number of processing cores, and each of the grid cells of each subdomain being assigned a local cell identifier that uniquely identifies the grid cell from the other grid cells of the subdomain;
  determining, based on the subdomains identified, domain decomposition characteristics indicative of processing overhead attributable to computations and communications for the grid cells of the subdomains;
  comparing the domain decomposition characteristics to the target domain decomposition parameters to determine that at least one of the of the target domain decomposition parameters is not satisfied by the domain decomposition characteristics; and
in response to determining that at least one of the domain decomposition parameters is not satisfied by the domain decomposition characteristics, conducting a dynamic repartitioning operation comprising:
  determining a domain decomposition snapshot comprising the weight array and a global-to-local mapping, the global-to-local mapping comprising, for each of the grid cells of the domain, a mapping of the global cell identifier for the grid cell to the local cell identifier associated with the grid cell;
  determining data exchange processes of the domain decomposition;
  determining a reduced number of processing cores;
  determining, based on the data exchange processes, regrouped data exchange processes;

conducting, based on the weight array, the regrouped data exchange processes and the reduced number of processing cores, an updated domain decomposition to identify updated subdomains, the number of updated subdomains corresponding to the reduced number of processing cores;

distributing, based on the updated subdomains and the global-to-local mapping, weight array indices to processors of processing cores associated with the updated subdomains;

determining, based on the distribution of the weight array indices, an updated connectivity graph for the domain;

determining, based on the updated subdomains and the updated connectivity graph for the domain, updated domain decomposition characteristics of the update subdomains, the updated domain decomposition characteristics being indicative of processing overhead attributable to computations and communications for the grid cells of the updated subdomains;

comparing the updated domain decomposition characteristics of the updated subdomains to the target domain decomposition parameters to determine that the target domain decomposition parameters are satisfied by the updated domain decomposition characteristics; and in response to determining that the domain decomposition parameters are satisfied by the updated domain decomposition characteristics, conducting the simulation of the hydrocarbon reservoir using the updated subdomains identified and the reduced number of processing cores identified, to generate a simulation of the hydrocarbon reservoir.

9. The medium of claim 8, wherein the domain decomposition characteristics comprise a communication-to-computation ratio (CCR).

10. The medium of claim 8, wherein determining data exchange processes of the domain decomposition comprises:
identifying the message passing interface (MPI) processes for the domain decomposition; and
identifying, for each of the subdomains, a subset of the MPI processes associated with the subdomain and rakings of the MPI processes within the subset.

11. The medium of claim 10, wherein determining regrouped data exchange processes comprises regrouping the MPI processes for the domain decomposition to generate regrouped MPI processes corresponding to the reduced number of processing cores.

12. The medium of claim 8, the operations further comprising generating a field development plan (FDP) for the hydrocarbon reservoir based on the simulation of the hydrocarbon reservoir.

13. The medium of claim 8, the operations further comprising:
identifying well drilling parameters based on the simulation of the hydrocarbon reservoir; and
drilling a well in the hydrocarbon reservoir based on the well drilling parameters.

14. The medium of claim 8, the operations further comprising:
identifying well operating parameters based on the simulation of the hydrocarbon reservoir; and
operating a well in the hydrocarbon reservoir based on the well operating parameters.

15. A hydrocarbon reservoir development system comprising:
a hydrocarbon reservoir control system non-transitory computer readable storage medium comprising program instructions stored thereon that are executable by a processor to perform the following operations:
determining a model of a hydrocarbon reservoir;
determining target domain decomposition parameters for a simulation of the hydrocarbon reservoir;
determining an initial number of processing cores for processing the simulation of the hydrocarbon reservoir;
conducting a preliminary grid calculation of the model of the hydrocarbon reservoir to determine a domain of the model of the hydrocarbon reservoir, the domain comprising grid cells representing a portion of the hydrocarbon reservoir, where each of the grid cells of the domain has a global cell identifier that uniquely identifies the grid cell from the other grid cells of the domain;
determining a weight array for the domain, the weight array comprising, for each grid cell of the domain:
a weight indicative of a physical property of the portion of the hydrocarbon reservoir corresponding to the grid cell; and
an index that uniquely identifies the grid cell from the other grid cells of the domain;
determining a connectivity graph that corresponds to the weight array;
conducting, based the weight array and the connectivity graph, a DD of the domain to identify subdomains of the domain, the number of subdomains corresponding to the number of processing cores, and each of the grid cells of each subdomain being assigned a local cell identifier that uniquely identifies the grid cell from the other grid cells of the subdomain;
determining, based on the subdomains identified, domain decomposition characteristics indicative of processing overhead attributable to computations and communications for the grid cells of the subdomains;
comparing the domain decomposition characteristics to the target domain decomposition parameters to determine that at least one of the of the target domain decomposition parameters is not satisfied by the domain decomposition characteristics; and
in response to determining that at least one of the domain decomposition parameters is not satisfied by the domain decomposition characteristics, conducting a dynamic repartitioning operation comprising:
determining a domain decomposition snapshot comprising the weight array and a global-to-local mapping, the global-to-local mapping comprising, for each of the grid cells of the domain, a mapping of the global cell identifier for the grid cell to the local cell identifier associated with the grid cell;
determining data exchange processes of the domain decomposition;
determining a reduced number of processing cores;
determining, based on the data exchange processes, regrouped data exchange processes;
conducting, based on the weight array, the regrouped data exchange processes and the reduced number of processing cores, an updated domain decomposition to identify updated subdomains, the number of updated subdomains corresponding to the reduced number of processing cores;
distributing, based on the updated subdomains and the global-to-local mapping, weight array indices to processors of processing cores associated with the updated subdomains;

determining, based on the distribution of the weight array indices, an updated connectivity graph for the domain;

determining, based on the updated subdomains and the updated connectivity graph for the domain, updated domain decomposition characteristics of the update subdomains, the updated domain decomposition characteristics being indicative of processing overhead attributable to computations and communications for the grid cells of the updated subdomains;

comparing the updated domain decomposition characteristics of the updated subdomains to the target domain decomposition parameters to determine that the target domain decomposition parameters are satisfied by the updated domain decomposition characteristics; and in response to determining that the domain decomposition parameters are satisfied by the updated domain decomposition characteristics, conducting the simulation of the hydrocarbon reservoir using the updated subdomains identified and the reduced number of processing cores identified, to generate a simulation of the hydrocarbon reservoir.

16. The system of claim 15, wherein the domain decomposition characteristics comprise a communication-to-computation ratio (CCR).

17. The system of claim 15, wherein determining data exchange processes of the domain decomposition comprises:

identifying the message passing interface (MPI) processes for the domain decomposition; and identifying, for each of the subdomains, a subset of the MPI processes associated with the subdomain and rakings of the MPI processes within the subset.

18. The system of claim 17, wherein determining regrouped data exchange processes comprises regrouping the MPI processes for the domain decomposition to generate regrouped MPI processes corresponding to the reduced number of processing cores.

19. The system of claim 15, the operations further comprising generating a field development plan (FDP) for the hydrocarbon reservoir based on the simulation of the hydrocarbon reservoir.

20. The system of claim 15, the operations further comprising:

identifying well drilling parameters based on the simulation of the hydrocarbon reservoir; and drilling a well in the hydrocarbon reservoir based on the well drilling parameters.

21. The system of claim 15, the operations further comprising:

identifying well operating parameters based on the simulation of the hydrocarbon reservoir; and operating a well in the hydrocarbon reservoir based on the well operating parameters.

* * * * *